United States Patent [19]

Hale

[11] 4,268,569
[45] May 19, 1981

[54] COATING UNDERLAYERS

[75] Inventor: Thomas E. Hale, Warren, Mich.

[73] Assignee: General Electric Company, Detroit, Mich.

[21] Appl. No.: 10,145

[22] Filed: Feb. 7, 1979

[51] Int. Cl.³ .................. B32B 7/02; B32B 9/04; B32B 31/06; B32B 33/00

[52] U.S. Cl. ..................... 428/215; 72/462; 76/101 R; 76/101 A; 76/101 SM; 76/107 A; 428/217; 428/332; 428/334; 428/420; 428/457; 428/543

[58] Field of Search ............ 428/420, 457, 539, 539.5, 428/547, 548, 552, 661, 565, 627, 545, 664, 215, 217, 332, 334, 543

[56] References Cited

U.S. PATENT DOCUMENTS

| | | | |
|---|---|---|---|
| 3,640,689 | 2/1972 | Glaski et al. | 428/627 |
| 3,784,402 | 1/1974 | Reedy | 148/6.3 X |
| 3,787,223 | 1/1974 | Reedy | 148/6.3 X |
| 3,807,008 | 4/1974 | Reedy | 148/6.3 X |
| 3,837,896 | 9/1974 | Lindstrom et al. | 428/522 X |
| 3,854,991 | 12/1974 | Hale | 428/336 |
| 3,874,900 | 4/1975 | Post et al. | 148/16.5 X |
| 3,964,937 | 6/1976 | Post et al. | 148/6.35 |
| 4,035,541 | 7/1977 | Smith et al. | 428/217 |
| 4,101,703 | 7/1978 | Schintlmeister | 428/420 X |
| 4,150,195 | 4/1979 | Tobioka | 428/465 X |

Primary Examiner—James C. Cannon
Attorney, Agent, or Firm—Morgan, Finnegan, Pine, Foley & Lee

[57] ABSTRACT

A new and improved coated cemented carbide includes a cemented carbide substrate, an interlayer disposed on the substrate, and a coating of hafnium carbonitride and/or zirconium carbonitride which is firmly and adherently bonded to the substrate and interlayer, the coating having a specific carbon-to-nitrogen ration. Where the coating is hafnium carbonitride the interlayer is be selected from the group consisting of hafnium nitride, titanium nitride, zirconium nitride and a titanium nitride - titanium carbide combination, the titanium nitride - titanium carbide combination consisting of a first layer of titanium nitride and a second layer of titanium carbide overlying the layer of titanium nitride. Where the coating is zirconium carbonitride the interlayer is selected from the group of zirconium nitride, titanium carbide and hafnium carbide.

44 Claims, No Drawings

COATING UNDERLAYERS

BACKGROUND OF THE INVENTION

The present invention relates to coated cemented carbide products, and specifically, to means for improving the metal turning performance of such coated products.

Cemented carbides are well known for their unique combination of hardness, strength, and wear resistance and are accordingly extensively used for such industrial applications as cutting tools, drawing dies and wear parts. For abrasive wear and nonferrous metal-cutting applications, WC-Co compositions are preferred because of their high strength and good abrasion resistance. For steel machining applications, compositions consisting of WC-TiC-TaC-Co, TiC-Ni or Ti-Ni-Mo are preferred because they are less reactive with steel workpieces at high machining speeds. The use of carbides other than WC generally results in a significant strength reduction, however, which limits either the amount of TiC and other carbides that can be added or the severity of the application when large amounts of TiC are used.

It is known that the wear resistance of cemented carbides can be enhanced by the application of a thin coating of certain hard substances such as TiC and TiN. In this manner a better combination of toughness and metal-cutting wear resistance is obtained than can normally be obtained using uncoated compositions.

It is also known, e.g., from Austrian patent application No. 896/72, filed Feb. 4, 1972 and laid open to the public on May 15, 1973, that sintered carbide substrates can be provided with composite coatings comprising a first layer of titanium carbide and an overlying layer of titanium nitride, on the one hand, and a first layer of titanium carbide, an intermediate layer of titanium carbonitrides and an overlying layer of titanium nitride on the other hand.

A significant improvement in coated cemented carbides is reflected in U.S. Pat. No. 3,854,991 to Hale, issued Dec. 17, 1974 and entitled "Coated Cemented Carbide Products" the asignee of said patent being the same as that of the present invention. U.S. Pat. No. 3,854,991, which is incorporated herein by reference, discloses a coated cemented carbide product comprising a cemented carbide substrate and a fully dense hafnium or hafnium and zirconium carbonitride coating on the substrate. The coatings have a specific carbon-to-nitrogen ratio which enhances the performance of the carbide over such coatings as TiC and TiN.

It has now been discovered that a uniquely useful insert for cutting tools comprises a cemented carbide substrate on which has been deposited a first intermediate layer and then a hafnium carbonitride or zirconium carbonitride coating. More particularly, it has been found that underlayers of hafnium nitride, titanium nitride or zirconium nitride sandwiched between a cemented carbide substrate and a hafnium carbonitride coating enhances the performance of the insert. In addition, a specific two tier underlayer comprising a first layer of titanium nitride and a second layer of titanium carbide, overlying the titanium nitride layer, has been effective when sandwiched between the substrate and the hafnium carbonitride coating. When zirconium carbonitride coatings are used, underlayers of zirconium nitride, titanium carbide, or hafnium carbide have been effective.

It is an object of the subject invention to further enhance the toughness and wear resistance of known coated cemented carbides and to provide a process for effecting same.

SUMMARY OF THE INVENTION

Pursuant to the above-recited objectives, the subject invention provides a coated cemented carbide product comprising a cemented carbide substrate; an interlayer disposed on the substrate; and a fully dense coating of hafnium carbonitride which is firmly and adherently bonded to the substrate and the interlayer. In accordance with the subject invention, the interlayer may be hafnium nitride, zirconium nitride, titanium nitride, or a titanium nitride-titanium carbide double layer. The interlayer has a thickness which on the one hand permits complete surface coverage of the substrate while on the other hand does not adversely affect the strength and toughness of the insert. Broadly, the interlayer may have a thickness on the order of from a few angstroms, such as about 0.1 microns, to about 10 microns. Preferably, however, the total interlayer thickness is approximately 1 to 2 microns. It is also preferable that the hafnium carbonitride coating be on the order of approximately 1 to 10 microns thick, and have an X-ray diffraction lattice parameter within the range of about 4.55 to 4.64 angstrom units.

In another embodiment of the present invention the subject coated cemented carbide product comprises a cemented carbide substrate; an interlayer disposed on the substrate; and a fully dense coating of zirconium carbonitride which is firmly and adherently bonded to the substrate and the interlayer. In accordance with the subject invention and interlayer may be zirconium nitride, titanium carbide, or hafnium carbide, and has a thickness in the range of from approximately a few angstroms, such as about 0.1 microns, to about 10 microns. Preferably, however, the interlayer is approximately 1 to 2 microns thick. The zirconium carbonitride coating is preferably 1 to 10 microns thick, and has an X-ray diffraction lattice parameter within the range of about 4.58 to 4.67 angstrom units.

DETAILED DESCRIPTION OF THE PREFERRED EMBODIMENTS

The subject invention relates to coated cemented products, and specifically, to means for improving the metal turning performance of such coated products.

The term "cemented carbide" as used herein means one or more transitional carbides of a metal of Groups IVb, Vb and VIb of the Periodic Table (The Merck Index, 9th edition, 1976), cemented or bonded by one or more matrix metals selected from the Group Fe, Ni and Co. A typical cemented carbide may contain WC in a cobalt matrix or TiC in a nickel matrix. By "fully dense" coating is meant a coating of at least 99 percent of theoretical density and in most cases greater than 99.5 percent.

In accordance with the subject invention a new and improved coated cemented carbide comprises a cemented carbide substrate; an interlayer disposed on the substrate; and a fully dense coating of hafnium carbonitride and/or zirconium carbonitride which is firmly and adherently bonded to the interlayer and substrate, the hafnium carbonitride and/or zirconium carbonitride coating having a specific carbon-to-nitrogen ratio.

More particularly, it has been found that the use of specific interlayers disposed between the substrate and the particular hafnium carbonitride and/or zirconium carbonitride coatings greatly enhances the metal cutting and metal turning performance of the coated carbide.

Turning now to a more detailed description of the present invention, a first embodiment of the subject coated cemented carbide comprises a cemented carbide substrate; an interlayer disposed on the substrate; and a fully dense coating of hafnium carbonitride which is firmly and adherently bonded to the interlayer and the substrate, the hafnium carbonitride coating having an X-ray diffraction lattice parameter within the range of about 4.55 to 4.64 angstrom units. In accordance with the subject invention the interlayer may be hafnium nitride, titanium nitride, zirconium nitride, or a double layer comprising a first layer of titanium nitride disposed on the substrate and a second layer of titanium carbide overlying the layer of titanium nitride. Depending on the contemplated use of the insert to be formed, the interlayer may have a thickness on the order of from only a few angstroms, such as about 0.1 microns, to as much as 10 microns. The lower limit is determined by the need to obtain complete surface coverage of the substrate so as to effect the maximum degree of coating adhesion. The upper thickness limit is determined by the fact that the wear resistance, i.e. the strength and toughness of the insert to be formed, is inversely proportional to the thickness of the interlayer. In fact, it has been found that there is little, if any, improvement in adhesion or reduction in substrate porosity with interlayers having a thickness greater than 2 microns, and that in applications where the strength and toughness of the insert is important, the thickness of the subject interlayers should broadly be in the range of about 1–5 microns. Preferably, the interlayer has a thickness of about 1 to 2 microns, and most preferably only about 1 micron. In applications where the strength and toughness of the insert is not important the thickness of the interlayer may be as high as 10 microns. In practice, the different specific interlayers of the subject invention have been found to have somewhat different effects from each other when sandwiched between a cemented carbide substrate and a hafnium carbonitride coating. For example, cemented carbides having a hafnium carbonitride coating and a hafnium nitride interlayer have been found to exhibit enhanced cutting performance, especially with respect to hardened alloy steel. Cemented carbides having a hafnium carbonitride coating and an interlayer of titanium nitride have been found to exhibit improved machining performance in the turning and milling of carbon steel. Cemented carbides having a hafnium carbonitride coating and a two tier interlayer comprising a first layer of titanium nitride disposed on the substrate and a second layer of titanium carbide overlying the titanium nitride layer have been found to exhibit improved machining performance, especially when used to turn cast iron.

In another embodiment of the present invention, the subject cemented carbide comprises a cemented carbide substrate; an interlayer disposed on the substrate; and a fully dense coating of zirconium carbonitride which is firmly and adherently bonded to the interlayer and the substrate. Preferably the zirconium carbonitride coating has an X-ray diffraction lattice parameter within the range of 4.58 to 4.67 angstrom units and a thickness of approximately 1 to 10 microns. In accordance with the subject invention the interlayer may be zirconium nitride, titanium carbide, or hafnium carbide. As with the previously discussed embodiment of the present invention, the interlayer, depending on the contemplated use of the insert to be formed, may have a thickness in the range of from only a few angstroms such as about 0.1 microns, to as high as 10 microns. However, where the wear resistance of the insert is important, the interlayer should have a thickness range no greater than about 1 to 5 microns, preferably approximately 1 to 2 microns, and most preferably approximately 1 micron.

Cemented carbides having a zirconium carbonitride coating and a zirconium nitride interlayer have been found to exhibit improved steel turning performance over carbides which had been simply coated. Cemented carbides having a zirconium carbonitride coating and titanium carbide interlayer have also been found to exhibit significant improvement in steel turning performance.

In order to more particularly describe the subject invention reference is made to the following examples.

EXAMPLE 1

A cemented carbide insert* (WC-8% TiC-11.5% TaC-8.5% Co) was coated with hafnium carbonitride employing a double interlayer comprising a layer of TiC overlying a layer of TiN under the following procedure. First a cemented carbide substrate was held for approximately ten minutes at approximately 1100° C. and about one atmosphere of pressure in a flowing atmosphere of $H_2$—50% $N_2$—3.5% $TiCl_2$ to form a layer of TiN approximately 1–3 microns thick.

* In all of the Examples the subject interlayers and coatings were placed on a Carboloy Grade 370 insert. In addition to the specific cemented carbide compositions referred to in the examples said grade carbide has the following general properties.

| | |
|---|---|
| Hardness (Rockwell A) | 90.7–91.5 |
| Density | 12.6 gm/cm$^3$ |
| Transverse Rupture Strength | 250,000 psi |
| Ultimate Compressive Strength | 750,000 psi |
| Modulus of Elasticity | 81,000,000 psi |
| Proportional Limit | 250,000 psi |
| Impact Strength (Charpy) | 8 in-lb |
| Abrasion Resistance ($\frac{1}{\text{vol. loss (cc)}}$) | 8 |
| Electrical Conductivity (% Copper at 25° C.) | 5.2% |
| Electrical Resistivity | 34.0 microhm-cm |

| THERMAL CONDUCTIVITY | |
|---|---|
| TEMPERATURE °C. | Cal. (Sec) (°C.) (cm) |
| 200 | 0.12 |
| 300 | 0.12 |
| 400 | 0.11 |
| 500 | 0.11 |

| COEFFICIENT OF THERMAL EXPANSION | |
|---|---|
| From Room Temp. to °F. | Expansion per° F. × 10$^{-6}$ |
| 400 | 3.2 |
| 750 | 3.3 |
| 1100 | 3.5 |
| 1500 | 3.6 |
| 1800 | 3.8 |

The substrate having this TiN layer was then held for about ten minutes at approximately 1100° C. and about one atmosphere of pressure in a flowing atmosphere of $H_2$—5% $CH_4$—3.5% $TiCl_4$ to form a ½ to 1 micron layer of TiC overlying the layer of TiN. The double interlayered substrate was then held for approximately sixty minutes at about 1100° C. and about 50 mm pressure in a flowing atmosphere of $H_2$—17% $N_2$—1.3% $CH_4$—about 2% $HfCl_4$ to form a coating, approximately 5 microns thick, of hafnium carbonitride. The above prepared coated insert was used to machine SAE 1045 steel having a hardness of 190 BHN at a speed of 500 surface feet per minute (SFPM), a depth of cut of 0.200 inches and a feed rate of 0.020 inches per revolution (ipr), and exhibited a smooth flank wear pattern.

EXAMPLE 2

A zirconium carbonitride coating on a cemented carbide (WC—8% TiC—11.5% TaC—8.5% Co) with an interlayer of zirconium nitride was prepared as follows:

(a) the cemented carbide substrate was held for approximately fifteen minutes at about 1135° C. and about one atmosphere of pressure in a flowing atmosphere of $H_2$-75% $N_2$—about 2% $ZrCl_4$ to form a thin layer of zirconium nitride; and (b) the substrates having said zirconium nitride layer was then held for about two hours at approximately 1135° C. and about one atmosphere of pressure in a flowing atmosphere of $H_2$—75% $N_2$—about 2% $ZrCl_4$—0.33% $CH_4$ to form a zirconium carbonitride coating.

For purposes of comparison, another cemented carbide insert (WC—8% TiC—11.5% TaC—8.5% Co) was prepared by using only step (b) of the above procedure. The inserts prepared by each procedure were then sectioned and examined at a magnification of 1500× in a light microscope. The insert prepared using only step (b) was found to have a 4-5 micron thick zirconium carbonitride coating. However, significant porosity was observed in the surface region of the cemented carbide substrate directly beneath the coating. This porosity evidently resulted from a reaction between the coating and the substrate, and would be expected to be detrimental to the adhesion of the coating and the strength of the coated insert. The inserted prepared under both steps (a) and (b) was observed to have a 4-5 micron thick zirconium carbonitride coating with a thin, i.e. on the order of less than one micron thick, gold colored interlayer of zirconium nitride. There was no porosity in the substrate beneath this interlayer.

EXAMPLE 3

A cemented carbide insert (WC13 8% TiC—11.5% TaC—8.5% Co) was coated with zirconium carbonitride and an interlayer of titanium carbide as follows:

(a) the cemented carbide substrate was held for about 15 minutes at approximately 1100° C. and one atmosphere of pressure in a flowing atmosphere of $H_2$—5% $CH_4$—2% $TiCl_4$ to form a TiC layer about 1.5 microns thick.

(b) the substrate having said TiC layer was then held for about ninety minutes at about 1100° C. at a pressure of about 50 mm in a flowing atmosphere of $H_2$—13% $N_2$—1% $CH_4$—about 2% $ZrCl_4$ to form a zirconium carbonitride coating about 4 micron thick. When used to machine SAE 1045 steel having 190 BHN hardness, at a speed of 700 SFPM, a rate of feed of 0.010 ipr and a depth of cut of about 0.100 inches it was observed that the insert having the above prepared TiC interlayer had a very smooth flank wear pattern with no chipping or flaking.

It will be noted that the preferred process for forming the coatings and interlayers of the subject coated cemented carbides is chemical vapor deposition. However, it will be understood, that other processes such as sputtering, pack diffusion, salt bath plating, ion implantation, etc. may also be effectively employed.

In summary, the subject invention provides new and improved cemented carbides which represent a significant improvement over known coated cemented carbides. The subject carbides employ specific underlayers between the cemented carbide substrates and known coatings effecting an improved bond between the substrate and coating, and reduced porosity, and improving the overall metal cutting and metal turning performance of the carbide. The provision of the subject underlayers is easily incorporated into the known processes for forming cemented carbide tools, and thus, represents an economically viable manufacturing procedure.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. A coated cemented carbide product comprising:
   a cemented carbide substrate wherein any titanium contained therein is essentially in carbide form;
   an interlayer disposed on said substrate, said interlayer being selected from the group consisting of hafnium nitride, titanium nitride, zirconium nitride and a titanium nitride-titanium carbide combination, said titanium nitride-titanium carbide combination consisting of a first layer of titanium nitride and a second layer of titanium carbide overlying said first layer of titanium nitride; and
   a fully dense coating of hafnium carbonitride, said coating being firmly and adherently bonded to said interlayer and said substrate, said hafnium carbonitride coating having an X-ray diffraction lattice parameter within the range of about 4.55 to 4.64 angstrom units.

2. A coated cemented carbide product as recited in claim 1 in which said interlayer is sufficiently thick so as to obtain complete surface coverage of the substrate.

3. A coated cemented carbide product as recited in claim 1 in which said interlayer has a thickness in the range of from about 0.1 microns to 10 microns.

4. A coated cemented carbide product as recited in claim 1 in which said interlayer has a thickness in the range of from about 0.1 to 5 microns.

5. A coated cemented carbide product as recited in claim 1 in which said interlayer has a thickness on the range of from about 1 to 2 microns.

6. A coated cemented carbide product as recited in claim 1 in which said hafnium carbonitride coating has a thickness of approximately 1 to 10 microns.

7. A coated cemented carbide product as recited in claim 1 in which the interlayer is a layer of hafnium nitride.

8. A coated cemented carbide product as recited in claim 1 in which the interlayer is a layer of titanium nitride.

9. A coated cemented carbide product is recited in claim 1 in which the interlayer is a layer of zirconium nitride.

10. A coated cemented carbide product as recited in claim 1 in which the interlayer consists of a first layer of titanium nitride approximately ½ to 1 micron in thickness and a second layer of titanium carbide overlying said first layer of titanium nitride, said second layer of titanium carbide having a thickness of approximately ½ to 1 micron.

11. A coated cemented carbide product comprising:
a cemented carbide substrate wherein any titanium contained therein is essentially in carbide form;
an interlayer disposed on said substrate, said interlayer including a first layer of titanium nitride approximately 1 to 3 microns thick, and a second layer of titanium carbide approximately ½ to 1 micron thick overlying said titanium nitride layer; and
a fully dense coating of hafnium carbonitride about 5 microns thick which is firmly and adherently bonded to said interlayer and said substrate, said hafnium carbonitride coating having an X-ray diffraction lattice parameter within the range of about 4.55 to 4.64 angstrom units.

12. A coated cemented carbide product comprising:
a cemented carbide substrate wherein any titanium contained therein is essentially in carbide form;
an interlayer disposed on said substrate, said interlayer being selected from the group consisting of zirconium nitride, hafnium carbide and titanium carbide; and
a fully dense coating of zirconium carbonitride firmly and adherently bonded to said interlayer and said substrate, said zirconium carbonitride coating having an X-ray diffraction lattice parameter within the range of about 4.58 to 4.67 angstrom units.

13. A coated cemented carbide product as recited in claim 12 in which said interlayer is sufficiently thick so as to obtain complete surface coverage of the substrate.

14. A coated cemented carbide product as recited in claim 12 in which said interlayer has a thickness in the range of from about 0.1 microns to about 10 microns.

15. A coated cemented carbide product as recited in claim 12 in which said interlayer has a thickness in the range of about 1 to 2 microns.

16. A coated cemented carbide product as recited in claim 12 in which said interlayer has a thickness in the range of about 0.1 to 5 microns.

17. A coated carbide product as recited in claim 12 in which said zirconium carbonitride coating has a thickness in the range of approximately 1 to 10 microns.

18. A coated cemented carbide product as recited in claim 12 in which the interlayer is zirconium nitride.

19. A coated cemented carbide product as recited in claim 12 in which the interlayer is titanium carbide.

20. A coated cemented carbide product as recited in claim 12 in which the interlayer is hafnium carbide.

21. A coated cemented carbide product comprising:
a cemented carbide substrate wherein any titanium contained therein is essentially in carbide form;
an interlayer of zirconium nitride less than 1 micron thick disposed on said substrate; and
a fully dense coating of zirconium carbonitride approximately 4 to 5 microns thick which is firmly and adherently bonded to said interlayer and said substrate, said zirconium carbonitride coating having an X-ray diffraction lattice parameter within the range of about 4.58 to 4.67 angstrom units.

22. A coated cemented carbide product comprising:
a cemented carbide substrate wherein any titanium contained therein is essentially in carbide form;
an interlayer of titanium carbide approximately 1.5 microns thick disposed on said substrate; and
a fully dense coating of zirconium carbonitride approximately 4 microns thick which is firmly and adherently bonded to said interlayer and said substrate, said zirconium carbonitride coating having an X-ray diffraction lattice parameter within the range of about 4.58 to 4.67 angstrom units.

23. A coated cemented carbide product comprising:
a cemented carbide substrate comprised of WC—TiC—TaC—Co;
an interlayer disposed on said substrate, said interlayer being selected from the group consisting of hafnium nitride, titanium nitride, zirconium nitride and a titanium nitride-titanium carbide combination, said titanium nitride-titanium carbide combination consisting of a first layer of titanium nitride and a second layer of titanium carbide overlying said first layer of titanium nitride; and
a fully dense coating of hafnium carbonitride, said coating being firmly and adherently bonded to said interlayer and said substrate, said hafnium carbonitride coating having an X-ray diffraction lattice parameter within the range of about 4.55 to 4.64 angstrom units.

24. A coated cemented carbide product as recited in claim 23 in which said interlayer is sufficiently thick so as to obtain complete surface coverage of the substrate.

25. A coated cemented carbide product as recited in claim 23 in which said interlayer has a thickness in the range of from about 0.1 microns to 10 microns.

26. A coated cemented carbide product as recited in claim 23 in which said interlayer has a thickness in the range of from about 0.1 to 5 microns.

27. A coated cemented carbide product as recited in claim 23 in which said interlayer has a thickness on the range of from about 1 to 2 microns.

28. A coated cemented carbide product as recited in claim 23 in which said hafnium carbonitride coating has a thickness of approximately 1 to 10 microns.

29. A coated cemented carbide product as recited in claim 23 in which the interlayer is a layer of hafnium nitride.

30. A coated cemented carbide product as recited in claim 23 in which the interlayer is a layer of titanium nitride.

31. A coated cemented carbide product as recited in claim 23 in which the interlayer is a layer of zirconium nitride.

32. A coated cemented carbide product as recited in claim 23 in which the interlayer consists of a first layer of titanium nitride approximately ½ to 1 micron in thickness and a second layer of titanium carbide overlying said first layer of titanium nitride, said second layer of titanium carbide having a thickness of approximately ½ to 1 micron.

33. A coated cemented carbide product comprising:
a cemented carbide substrate comprised of WC—TiC—TaC—Co;
an interlayer disposed on said substrate, said interlayer including a first layer of titanium nitride approximately 1 to 3 microns thick, and a second layer of titanium carbide approximately ½ to 1 micron thick overlying said titanium nitride layer; and a fully dense coating of hafnium carbonitride about 5 microns thick which is firmly and adherently bonded to said interlayer and said substrate, said hafnium carbonitride coating having an X-ray diffraction lattice parameter within the range of about 4.55 to 4.64 angstrom units.

34. A coated cemented carbide product comprising:

a cemented carbide substrate comprised of WC—TiC—TaC—Co;

an interlayer disposed on said substrate, said interlayer being selected from the group consisting of zirconium nitride, hafnium carbide and titanium carbide; and a fully dense coating of zirconium carbonitride firmly and adherently bonded to said interlayer and said substrate, said zirconium carbonitride coating having an X-ray diffraction lattice parameter within the range of about 4.58 to 4.67 angstrom units.

35. A coated cemented carbide product as recited in claim 34 in which said interlayer is sufficiently thick so as to obtain complete surface coverage of the substrate.

36. A coated cemented carbide product as recited in claim 34 in which said interlayer has a thickness in the range of from 0.1 microns to about 10 microns.

37. A coated cemented carbide product as recited in claim 34 in which said interlayer has a thickness in the range of about 1 to 2 microns.

38. A coated cemented carbide product as recited in claim 34 in which said interlayer has a thickness in the range of about 0.1 to 5 microns.

39. A coated carbide product as recited in claim 34 in which said zirconium carbonitride coating has a thickness in the range of approximately 1 to 10 microns.

40. A coated cemented carbide product as recited in claim 34 in which the interlayer is zirconium nitride.

41. A coated cemented carbide product as recited in claim 34 in which the interlayer is titanium carbide.

42. A coated cemented carbide product as recited in claim 34 in which the interlayer is hafnium carbide.

43. A coated cemented carbide product comprising:

a cemented carbide substrate comprised of WC—8% TiC—11.5% TaC—8.5% Co;

an interlayer of zirconium nitride less than 1 micron thick disposed on said substrate; and a fully dense coating of zirconium carbonitride approximately 4 to 5 microns thick which is firmly and adherently bonded to said interlayer and said substrate, said zirconium carbonitride coating having an X-ray diffraction lattice parameter within the range of about 4.58 to 4.67 angstrom units.

44. A coated cemented carbide product comprising:

a cemented carbide substrate comprised of WC—8% TiC—11.5% TaC—8.5% Co;

an interlayer of titanium carbide approximately 1.4 microns thick disposed on said substrate; and a fully dense coating of zirconium carbonitride approximately 4 microns thick which is firmly and adherently bonded to said interlayer and said substrate, said zirconium carbonitride coating having an X-ray diffraction lattice parameter within the range of about 4.58 to 4.67 angstrom units.

* * * * *